May 21, 1940.    I. SHORT    2,201,247

REDUCTION GEAR

Filed Dec. 13, 1938

INVENTOR
IRA SHORT.
BY
ATTORNEY

Patented May 21, 1940

2,201,247

UNITED STATES PATENT OFFICE 2,201,247

REDUCTION GEAR

Ira Short, Prospect Park, Pa., assignor to Westinghouse Electric & Manufacturing Company, East Pittsburgh, Pa., a corporation of Pennsylvania Application December 13, 1938, Serial No. 245,486

6 Claims. (Cl. 74—449)

My invention relates to gearing, more particularly of the high power reduction type, and it has for an object to provide a fabricated gear having improved features of construction.

A further object of my invention is to provide a gear with an improved web construction joining the hub or spindle and the rim, the web construction, not only being strong and light, but also having the desired stiffness in all directions.

A further object of my invention is to provide a gear comprising a rim and a fabricated center having circumferential attachment zones with respect to the rim so spaced that the gear rim is subject to uniform deflection with respect to the zones of support.

These and other objects are effected by my invention as will be apparent from the following description and claims taken in connection with the accompanying drawing, forming a part of this application, in which:

Figure 1:
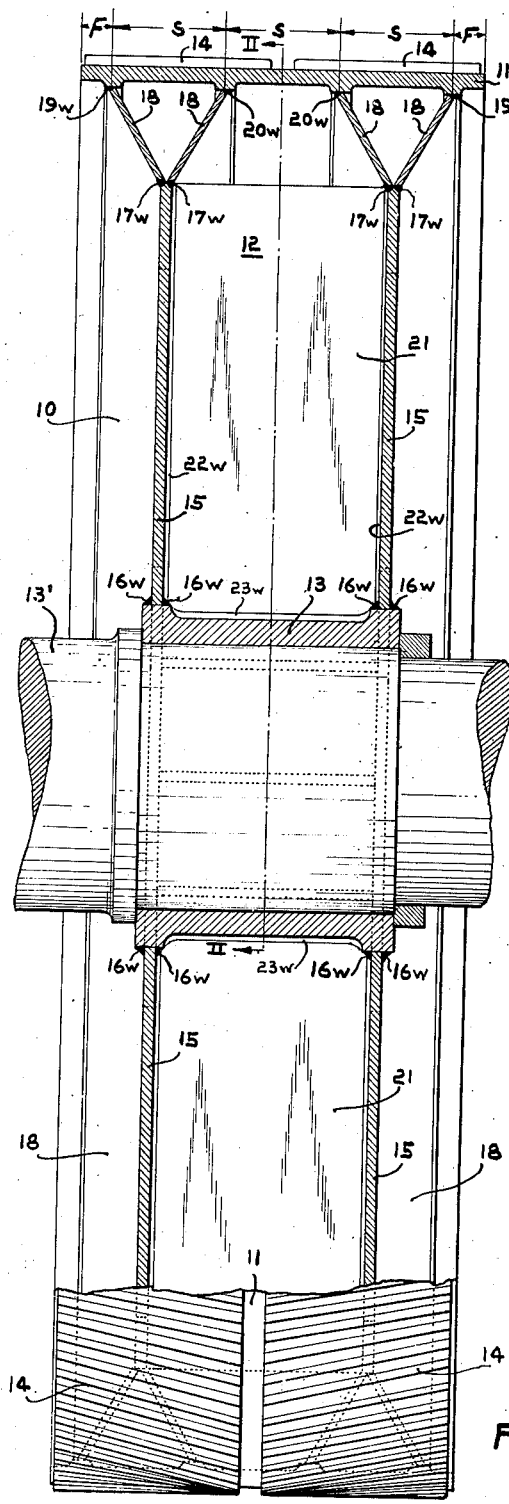
Fig. 1 is a partial sectional and elevational view of my improved gear.

Referring to the drawing more in detail, there is shown a gear comprising a center 10 and a rim 11, the center including a fabricated web construction, at 12, joined peripherally to the interior of the rim. The web construction may be attached to a spindle or shaft element 13, which may be a hub, as shown, encompassing and attached to the spindle or shaft 13' or the latter where no hub is employed. The rim is preferably provided with a pair of spaced and helically-opposed rows of teeth 14—14.

The web construction, at 12, comprises a pair of spaced circular plates 15—15 joined circumferentially to the spindle element, preferably by welds 16W, and having their peripheries joined, by welds 17W, to the inner edges of pairs of outwardly-diverging conical plates 18—18, the latter having their peripheries joined by outermost welds 19W and intermediate welds 20W to the inner surface of the rim.

The pair of parallel inner circular plates 15—15 are stiffened laterally by any suitable means, for example, by the radially-extending plates 21 arranged between the plates 15—15 and joined thereto by means of welds 22W. Also, the inner edges of the plates 21 are connected, by welds 23W, to the periphery of the spindle element 13.

Figure 2:
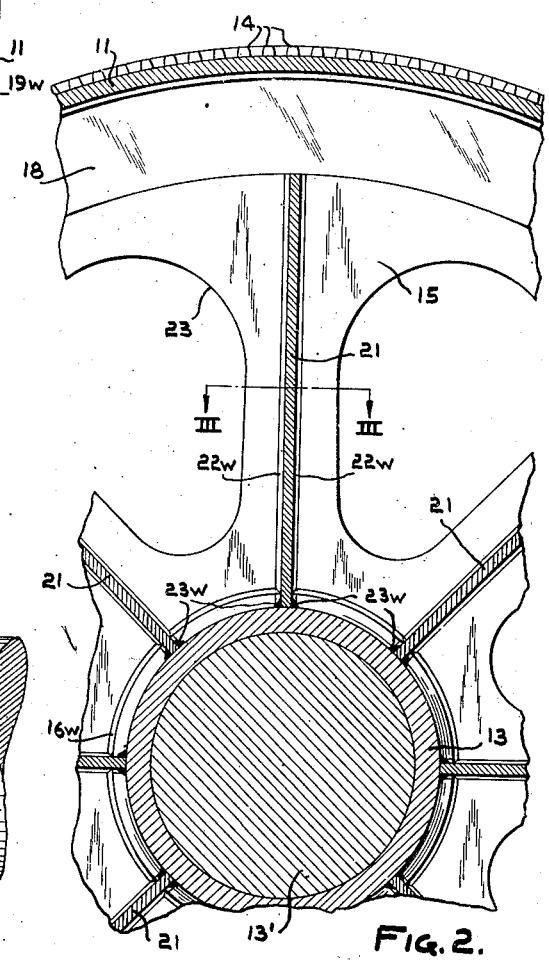
Fig. 2 is a fragmentary sectional view taken along the line II—II of Fig. 1.
Figure 3:
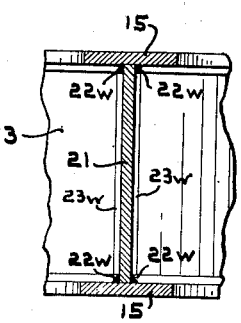
Fig. 3 is a fragmentary sectional view taken along the line III—III of Fig. 2.

The side plates are preferably provided with pear-shaped openings 23 arranged alternately with respect to the radial plates 21, these openings affording access to the interior of the web construction, at 12, to facilitate welding. Furthermore, the presence of the openings provides a lighter gear. From Figs. 2 and 3, it will be noted that the radial plates 21 and the side plates 15—15 in effect constitute spokes of I or H cross-section arranged alternately with respect to the openings, such spokes being stiff in all directions, that is, laterally, circumferentially and torsionally.

The spacing of the inner plates 15—15 and the construction and arrangement of the pairs of outer conical plates 18—18 are such that the circumferential junction zones of the peripheries of the latter with the inner surface of the rim are so spaced as to secure uniform deflection of the gear teeth and rim, that is, the portions of the gear overhanging the outermost circumferential welds 19W extend a distance F outwardly from the latter such that the deflection of such overhanging portions will be equal to the deflections of portions of the gear arranged intermediately of the welds 19W and 20W, the latter portions being spaced a uniform distance S apart.

From the foregoing, it will be apparent that I have devised a gear of the fabricated type which is light, strong and stiff and which incorporates a novel arrangement of web construction for supporting the rim so that the teeth are subject to uniform deflection and also in such manner that the circumferential strength of the gear is preserved.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a gear, a spindle element, a rim having peripheral teeth, and a web construction joining the spindle element to the rim; said web construction comprising a pair of spaced, parallel, circular inner plates and pairs of conical outer plates joined, respectively, to the peripheries of the inner plates and to the inner surface of the rim, the plates of the respective outer pairs diverging outwardly from their inner plates so that the peripheries thereof have four spaced zones of circumferential attachment to the rim.

2. In a gear, a spindle element, a rim having peripheral teeth, and a web construction joining the spindle element to the rim; said web construction comprising a pair of spaced, parallel, circular inner plates, means arranged between and joined to the inner plates for stiffening the latter laterally, and pairs of conical outer plates joined, respectively, to the peripheries of the inner plates and to the inner surface of the rim, the plates of the respective outer pairs diverging outwardly from their inner plates so as to provide four spaced zones of circumferential attachment of the peripheries thereof to the rim.

3. In a gear, a spindle element, a rim having peripheral teeth, and a web construction joining the spindle element to the rim; said web construction comprising a pair of spaced, parallel, circular inner plates, radial plates extending between the inner plates and having their side edges joined to the latter, and pairs of conical outer plates joined, respectively, to the peripheries of the inner plates and to the inner surface of the rim, the plates of the respective outer pairs diverging outwardly from their inner plates to provide four spaced zones of circumferential attachment of the peripheries thereof to the rim.

4. The combination as claimed in claim 3 wherein at least one of the inner plates is provided with access openings arranged alternately with respect to the radial plates to lighten the gear and to facilitate work of interior fabrication.

5. In a gear, a spindle element, a rim having two spaced rows of peripheral teeth, and a web construction joining the spindle element to the rim; said web construction comprising a pair of spaced, parallel, circular inner plates, means arranged between and joined to said plates to provide lateral stiffness therefor, and pairs of conical outer plates joined, respectively, to the peripheries of the inner plates and to the inner surface of the rim, the plates of the respective outer pairs diverging upwardly from their inner plates to provide four spaced zones of circumferential attachment of the peripheries thereof to the rim with such zones of attachment arranged between and near to the ends of each row of teeth.

6. In a gear, a spindle element, a rim having two spaced rows of peripheral teeth, and a web construction joining the spindle element to the rim; said web construction comprising a pair of spaced, parallel, circular inner plates, means arranged between and joined to said plates to provide lateral stiffness therefor, and pairs of conical outer plates joined, respectively, to the peripheries of the inner plates and to the inner surface of the rim, the plates of the respective outer pairs diverging outwardly from their inner plates to provide four spaced zones of circumferential attachment of the peripheries thereof to the rim with such zones of attachment arranged between and near to the ends of each row of teeth, said zones being spaced equal distances apart and the outermost zones being spaced from the outermost ends of the teeth distances such that the deflection of the portions of the rim overhanging the outermost plates will be equal to the deflections thereof between zones of circumferential attachment.

IRA SHORT.